United States Patent
Hyodo et al.

(10) Patent No.: US 8,775,034 B2
(45) Date of Patent: Jul. 8, 2014

(54) SHIFT CONTROL SYSTEM FOR INDUSTRIAL VEHICLE

(75) Inventors: Koji Hyodo, Kasumigaura (JP); Atsushi Shimazu, Toride (JP); Hirofumi Oouchi, Toride (JP); Tadayoshi Aoki, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 12 days.

(21) Appl. No.: 13/516,098

(22) PCT Filed: Dec. 14, 2010

(86) PCT No.: PCT/JP2010/072498
§ 371 (c)(1),
(2), (4) Date: Jun. 14, 2012

(87) PCT Pub. No.: WO2011/074583
PCT Pub. Date: Jun. 23, 2011

(65) Prior Publication Data
US 2012/0296531 A1 Nov. 22, 2012

(30) Foreign Application Priority Data
Dec. 14, 2009 (JP) .................................. 2009-283139

(51) Int. Cl.
*G06F 19/00* (2011.01)
(52) U.S. Cl.
USPC .............................................. 701/50; 701/51
(58) Field of Classification Search
USPC .............. 701/50; 477/175; 475/125, 126, 146
See application file for complete search history.

(56) References Cited

U.S. PATENT DOCUMENTS

| | | | | |
|---|---|---|---|---|
| 5,106,348 A | * | 4/1992 | Koivunen | 475/126 |
| 5,168,777 A | * | 12/1992 | Isono et al. | 477/152 |
| 2008/0312038 A1 | * | 12/2008 | Nakagawa et al. | 477/175 |
| 2009/0248258 A1 | * | 10/2009 | Fukumoto | 701/50 |
| 2010/0016120 A1 | * | 1/2010 | Dickinson et al. | 477/107 |
| 2010/0191404 A1 | * | 7/2010 | Ishikawa et al. | 701/29 |

FOREIGN PATENT DOCUMENTS

| | | |
|---|---|---|
| JP | 63-265730 A | 11/1988 |
| JP | 3344491 B2 | 11/2002 |
| WO | WO 2008/066169 A1 | 6/2008 |

OTHER PUBLICATIONS

International Search Report dated Jan. 25, 2011 (One (1) page).

* cited by examiner

*Primary Examiner* — Fadey Jabr
*Assistant Examiner* — Martin Weeks
(74) *Attorney, Agent, or Firm* — Crowell & Moring LLP

(57) ABSTRACT

A shift control system for an industrial vehicle includes: a vehicle speed detection device that detects a vehicle speed; a transmission device that shifts up and shifts down a speed stage of a transmission; a shift control device that permits shift up when a vehicle speed becomes equal to or greater than a shift up permission vehicle speed; a height position detection device that detects a height position of a working machine device; a forward/backward switch device that switches the industrial vehicle between forward travel and backward travel; and a shift up control switch selection device that switches between normal control, in which shift up is performed by the transmission device when the vehicle speed becomes equal to or greater than the shift up permission vehicle speed, and delay control, in which shift up timing is delayed with respect to the normal control.

9 Claims, 8 Drawing Sheets (a) BACKWARD MOVEMENT AFTER EXCAVATION (b) FORWARD LOADING (a) BACKWARD MOVEMENT AFTER EXCAVATION (b) FORWARD LOADING

SHIFT CONTROL SYSTEM FOR INDUSTRIAL VEHICLE

TECHNICAL FIELD

The present invention relates to a shift control system for an industrial vehicle.

BACKGROUND ART

There is a shift control system for an industrial vehicle such as a wheel loader known in the related art that automatically changes a speed stage at a transmission when the vehicle speed becomes a setting speed. For example, when a wheel loader performs a work of loading soil onto a dump truck or the like, the vehicle speed may unintentionally fluctuate if the speed stage is changed at the time of approaching the dump truck. Accordingly, there is a shift control system known in the related art that is configured to hold a set speed stage for a predetermined period of time when the height of a working machine device (bucket) that is calculated from an angle of a lift arm or the like becomes equal to or greater than a setting height (refer to the patent literature 1).

CITATION LIST

Patent Literature

PATENT LITERATURE 1 Japanese Patent No. 3344491

SUMMARY OF INVENTION

Technical Problem

However, if the shift control system described above is configured so that the setting speed described above for determining the shift timing is lowered more as the rotation number of an engine is lower, the speed stage is immediately shifted up during backward travel after excavation work. As a result, when the vehicle travel is switched to forward travel for loading soil onto a dump truck, a drifting of the vehicle at the time of backward travel deceleration becomes greater and the work efficiency is reduced. In addition, when the vehicle is approaching to a dump truck in forward travel for loading soil, if the accelerator pedal depressing amount is small and the engine rotation number is small, the vehicle speed reaches the setting speed before the bucket reaches the setting height described above and the speed stage may be shifted up unintentionally. Since this shift up causes the vehicle to accelerate, the vehicle results in approaching the dump truck earlier than the operator expects. In this case, the operator needs to apply the brake to stop the vehicle and uplift the bucket to a height position where soil can be loaded onto the dump truck. This may lower the work efficiency.

Solution to Problem

A shift control system for industrial vehicle according to a first aspect of the present invention, comprises: a vehicle speed detection device that detects a vehicle speed of an industrial vehicle; a transmission device that shifts up and shifts down a speed stage of a transmission; a shift control device that permits shift up by the transmission device when a vehicle speed detected by the vehicle speed detection device becomes equal to or greater than a shift up permission vehicle speed; a height position detection device that detects a height position of a working machine device; a forward/backward switch device that switches the industrial vehicle between forward travel and backward travel; and a shift up control switch selection device that switches between normal control, in which shift up is performed by the transmission device when the vehicle speed becomes equal to or greater than the shift up permission vehicle speed, and delay control, in which shift up timing is delayed with respect to the normal control.

According to a second aspect of the present invention, in the shift control system for industrial vehicle according to the first aspect, it is preferable that speed stages at the transmission include 3 speeds or more; when the delay control has been selected by the shift up control switch selection device, if forward travel is selected by the forward/backward switch device; the shift control device sets the shift up permission vehicle speed to a first shift up permission vehicle speed if a height position of the working machine device that is detected by the height position detection device is lower than a setting value, and sets the shift up permission vehicle speed to a second shift up permission vehicle speed that is greater than the first shift up permission vehicle speed if a height position of the working machine device is equal to or greater than the setting value; and when a height position of the working machine device is equal to or greater than the setting value, the shift control device controls the transmission device so that a speed stage at the transmission is shifted up from speed 2 to speed 3 if the vehicle speed has continued to be equal to or greater than the second shift up permission vehicle speed for a forward travel setting time.

According to a third aspect of the present invention, in the shift control system for industrial vehicle according to the first or second aspects, it is preferable that speed stages at the transmission include 3 speeds or more; when the delay control has been selected by the shift up control switch selection device, if backward travel is selected by the forward/backward switch device; the shift control device sets the shift up permission vehicle speed to a second shift up permission vehicle speed that is greater than a first shift up permission vehicle speed, regardless of a height of the working machine device, and controls the transmission device so that a speed stage at the transmission is shifted up from speed 2 to speed 3 if the vehicle speed has continued to be equal to or greater than the second shift up permission vehicle speed for a backward travel setting time.

According to a fourth aspect of the present invention, in the shift control system for industrial vehicle according to the first to third aspects, it is preferable that speed stages at the transmission include 3 speeds or more; the shift control device sets the shift up permission vehicle speed to a first shift up permission vehicle speed when the normal control has been selected by the shift up control switch selection device regardless of a height of the working machine device and setting of the forward/backward switch device, and controls the transmission device so as to shift up a speed stage at the transmission from speed 2 to speed 3 when the vehicle speed becomes equal to or greater than the first shift up permission vehicle speed.

A wheel loader according to a fifth aspect of the present invention comprises a shift control system according to the first to fourth aspects.

Advantageous Effect of the Invention

Shift up can be voluntarily switched and selected between normal control and delay control corresponding to a work content for an industrial vehicle or to a taste of the operator, and the work efficiency of the industrial vehicle can be improved.

DESCRIPTION OF EMBODIMENTS

Figure 1:
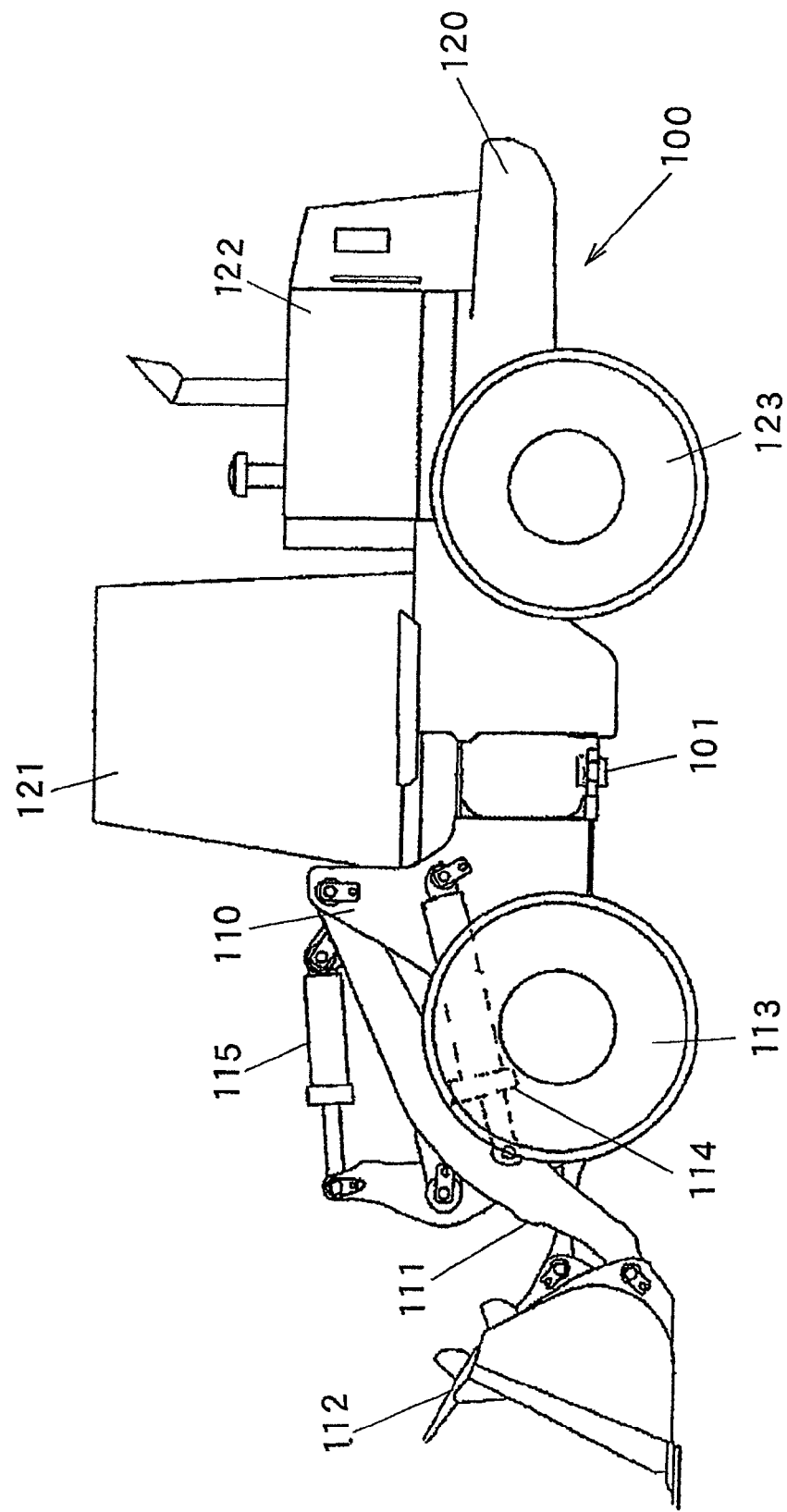
[FIG. 1] A side view of a wheel loader that is an example of an industrial vehicle according to an embodiment of the present invention.

An embodiment of a shift control system for an industrial vehicle according to the present invention will now be explained with reference to FIGS. 1 to 8. FIG. 1 is a side view of a wheel loader that is an example of an industrial vehicle to which the shift control system according to the present embodiment is applied. A wheel loader 100 is constituted with a front body 110 that includes an arm 111, a bucket 112 as a working machine device, tires 113, and the like and a rear body 120 that includes a driver cabin 121, an engine bay 122, tires 123, and the like. The arm 111 performs a turning (lifting) motion in vertical direction by actuating the arm cylinder 114, and the bucket 112 performs tilting motion in vertical direction (for dumping or crowding) by actuating the bucket cylinder 115. The front body 110 and the rear body 120 are rotatably articulated with each other by a center pin 101 and the front body 110 turns right and left with respect to the rear body 120 by extension or retraction of a steering cylinder (not shown).

Figure 2:
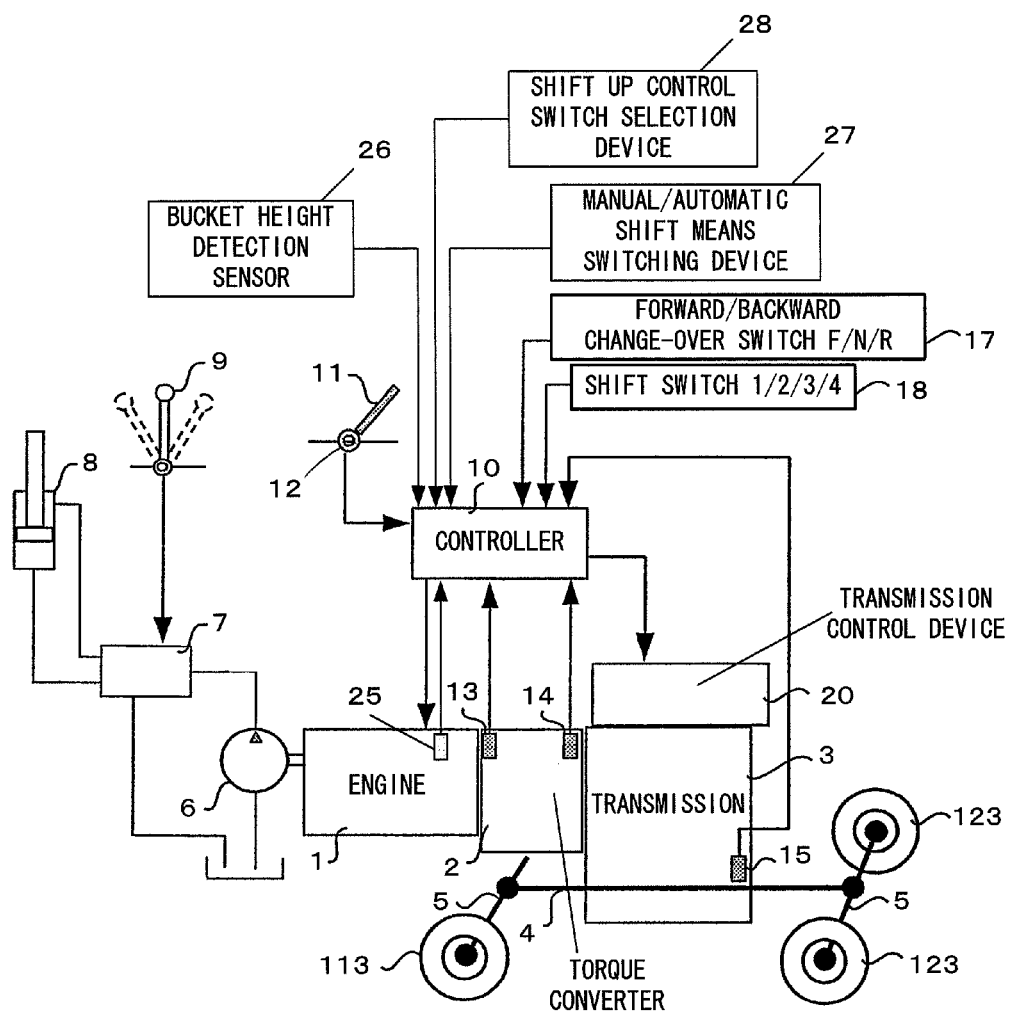
[FIG. 2] A block diagram for a structure of a shift control system.

FIG. 2 shows a block diagram for a structure of the shift control system according to the present embodiment. An input shaft (not shown) of a torque converter 2 is coupled to an output shaft of an engine 1, and an output shaft (not shown) of the torque converter 2 is coupled to a transmission 3. The torque converter 2 is a well known fluid clutch that is constituted with an impeller, a turbine, and a stator, and rotation of the engine 1 is transmitted to the transmission 3 through the torque converter 2. The transmission 3 includes a hydraulic clutch that shifts the speed stage within speed 1 through speed 4, and rotation speed of the output shaft of the torque converter 2 is changed via the transmission 3. Rotation after the speed shift is transmitted to the tires 113 and 123 through a propeller shaft 4 and an axle 5, and thus the wheel loader 100 travels. The rotation number of the engine 1 is detected by an engine rotation number sensor 25.

A working hydraulic pump 6 is driven by the engine 1, and the discharged oil from the hydraulic pump 6 is led to a working actuator 8 (for instance, the arm cylinder 114) via a directional control valve 7. The directional control valve 7 is driven by operating an operating lever 9, enabling to drive the actuator 8 in correspondence to the operation amount of the lever 9. The height of the bucket 112 is calculated by a controller 10 based upon a detection value at a sensor for detecting bucket height (bucket height detection sensor) 26. The bucket height detection sensor 26 is, for example, a sensor that detects an angle of the arm 111 with respect to the front body 110 and a sensor that detects an angle of the bucket 112 with respect to the arm 111. More specifically, the height of the bucket 112 is calculated by the controller 10 based upon detection values with those sensors and pre-stored information regarding the arm 111 such as length, shape, mounting position.

The torque converter 2 has a function to increase output torque with respect to input torque, i.e., a function to make a torque ratio 1 or greater. The torque ratio decreases with an increase in a torque converter speed ratio e (=Nt/Ni), which is a ratio of a rotation number Nt of the output shaft to a rotation number Ni of the input shaft of the torque converter 2. For example, when the travelling load increases during travelling at a constant engine rotation number, the rotation number of the output shaft of the torque converter 2, i.e., the vehicle speed decreases and the torque converter speed ratio e becomes smaller. At this time, since the torque ratio increases, the vehicle can travel with a greater drive force (traction force).

The transmission 3 is an automatic transmission machine that includes solenoid valves that corresponds to each speed stage. These solenoid valves are driven by a control signal that is output from the controller 10 to a transmission control device 20, thereby automatically changing the speed stage within speed 1 through speed 4. In the present embodiment, the transmission 3 assumes a speed stage, for instance, from speed 1 stage to speed 4 stage.

There are two types of automatic shift control, i.e., the torque converter speed ratio based control, which is to shift gears when the torque converter speed ratio e reaches a predetermined value, and the vehicle speed based control, which is to shift gears when the vehicle speed reaches a predetermined value. In the present embodiment, the speed stage of the transmission 3 is controlled by the vehicle speed based control.

Figure 3:
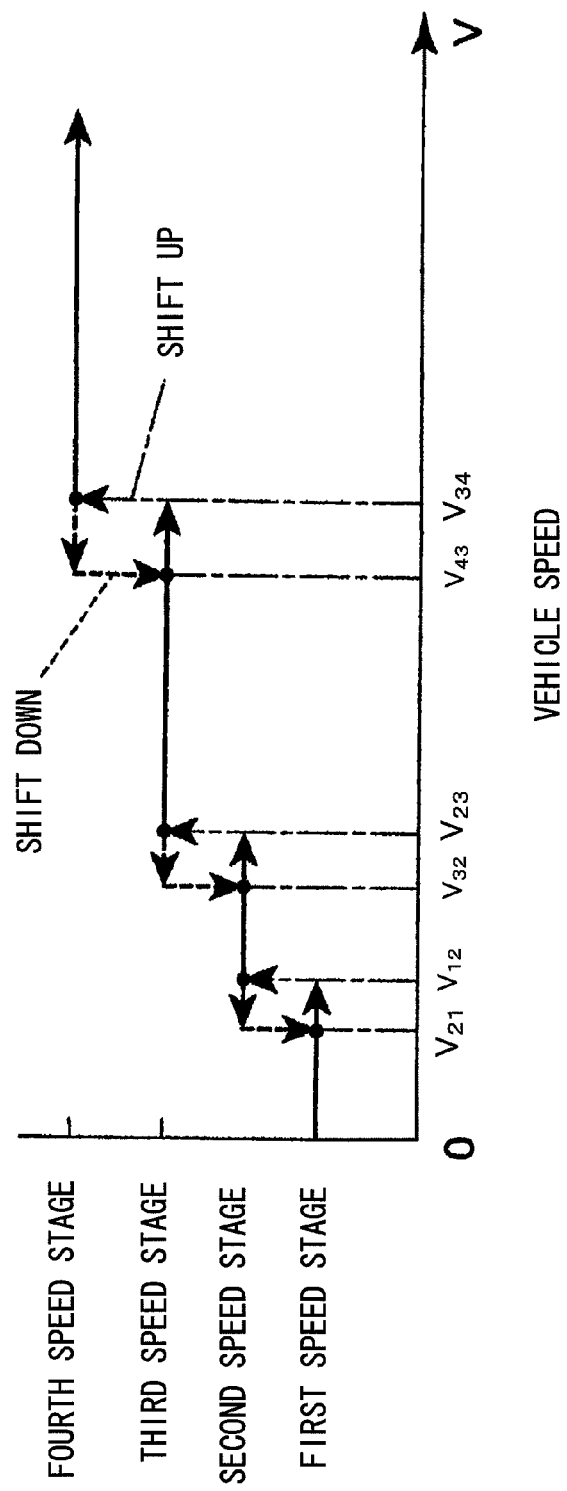
[FIG. 3] A chart that shows a relationship between a vehicle speed and a speed stage.

FIG. 3 is a chart that shows a relationship between a vehicle speed v and a speed stage. In the present embodiment, the controller 10 outputs a control signal to the transmission control device 20 in correspondence to the vehicle speed v and, as shown in FIG. 3, shifts the transmission 3 in correspondence to the vehicle speed v. More specifically, the speed stage is shifted up from speed 1 to speed 2 when the vehicle speed v increases to a shift permission vehicle speed v12, the speed stage is shifted up from speed 2 to speed 3 when the vehicle speed v increases from the shift permission vehicle speed v12 to a shift permission vehicle speed v23, and the speed stage is shifted up from speed 3 to speed 4 when the vehicle speed v increases from the shift permission vehicle speed v23 to a shift permission vehicle speed v34. On the other hand, the speed stage is shifted down from speed 4 to speed 3 when the vehicle speed v decreases to a shift permission vehicle speed v43, the speed stage is shifted down from speed 3 to speed 2 when the vehicle speed v decreases to a shift permission vehicle speed v32, and the speed stage is shifted down from speed 2 to speed 1 when the vehicle speed v decreases to a shift permission vehicle speed v21. It is to be noted that the shift permission vehicle speeds v12, v23, and v34 are set to greater than the shift permission vehicle speeds v21, v32, and v43, respectively, so that the shift change is stably carried out. Each of those shift permission vehicle speeds is a threshold value to permit shift up or shift down, which is set in advance in the controller 10. The transmission control device 20 is constituted with the solenoid valves that corresponds to each speed stage and is driven by a control signal from the controller 10.

In the present embodiment, the controller 10 lowers each of the shift permission vehicle speeds when the rotation number of the engine 1 is low and increases each of the shift permission vehicle speeds if the rotation number of the engine 1 is high. Thus, the controller 10 changes each of the shift permission vehicle speeds in correspondence to the rotation number of the engine 1, which is effective for fuel consumption reduction.

Figure 4:
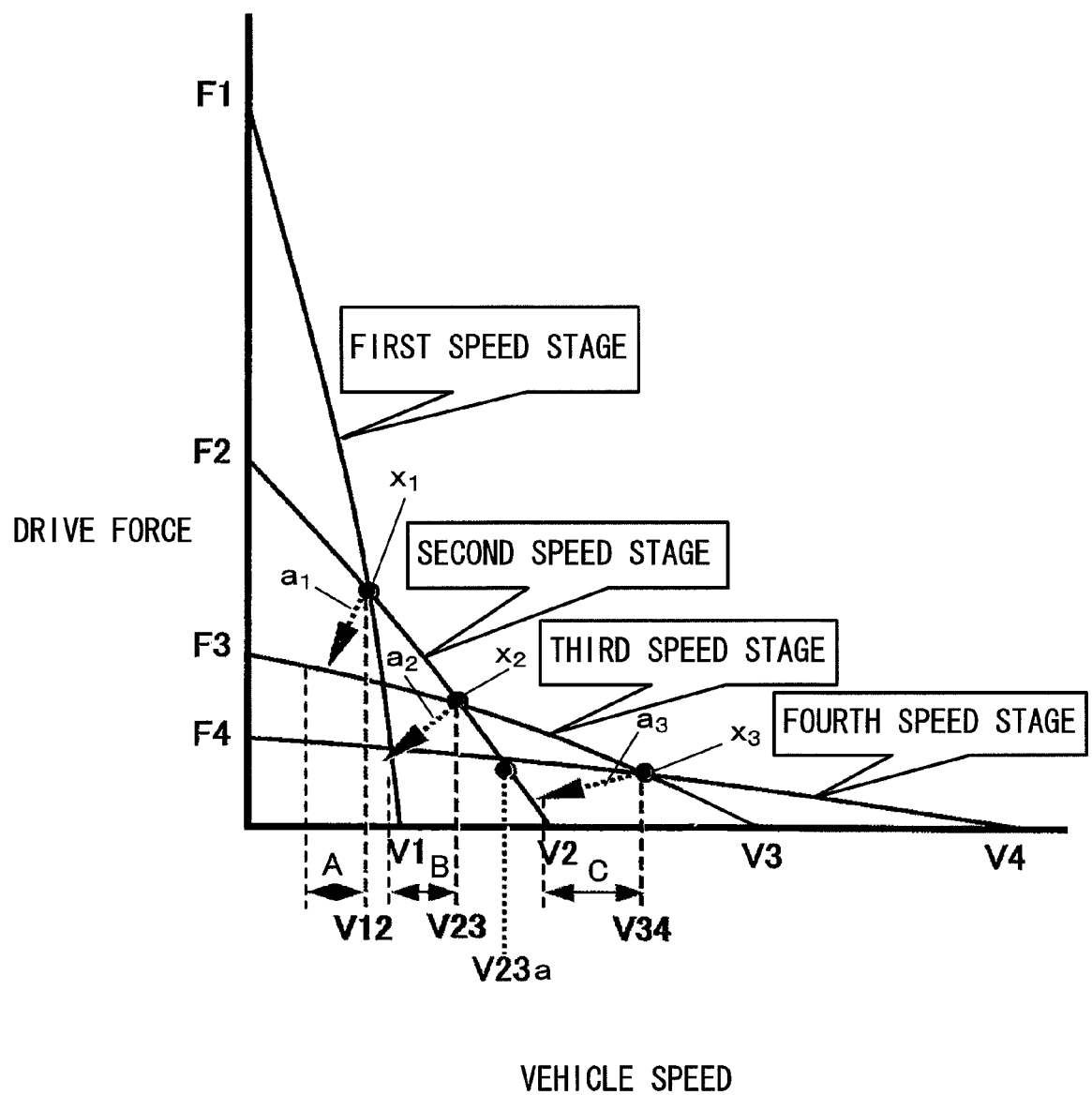
[FIG. 4] A chart that shows traveling performance of the wheel loader.

FIG. 4 is a chart that shows traveling performance of the wheel loader 100 of the present embodiment. While for the sake of convenience of explanation, FIG. 4 only presents a shift permission vehicle speed (shift up permission vehicle speed) at the time of shift up, it is similar for a shift permission vehicle speed (shift down permission vehicle speed) at the time of shift down. Intersection points x1, x2, and x3 of a curve that shows traveling performance at each speed stage shifts as shown by arrows a1, a2, and a3 as the rotation number of the engine 1 decreases. The shift permission vehicle speeds are substantially set to the intersection points x1, x2, and x3. In FIG. 4, vehicle speed ranges represented by A, B, and C indicate ranges in which the shift permission vehicle speeds v12, v23, and v34 change in correspondence to the rotation number of the engine 1, respectively.

In the present embodiment, in the delay control of shifting up which will be described later, the shift permission vehicle speed (first shift up permission vehicle speed) V23 shown in FIG. 4 is increased (raised), as indicated with a shift permission vehicle speed (second shift up permission vehicle speed) V23a, regardless of the rotation number of the engine 1, so that shift up from speed 2 to speed 3 is less likely to occur. Here, the second shift up permission vehicle speed v23a is set to a value that is higher by, for instance, approximately 10% than a maximum value of the first shift up permission vehicle speed v23 that changes in correspondence to the rotation number of the engine 1.

The controller 10 shown in FIG. 2 is configured to include an arithmetic processing unit that includes a CPU, a ROM, a RAM, other peripheral circuits, and the like. The controller 10 is connected with a pedal operation amount detector 12 that detects an operation amount of the accelerator pedal 11, a rotation number detector 13 that detects the rotation number Ni of the input shaft (not shown) of the torque converter 2, a rotation number detector 14 that detects the rotation number Nt of the output shaft (not shown) of the torque converter 2, and a vehicle speed detector 15 that detects the rotational speed of the output shaft of the transmission 3, i.e., the vehicle speed v. The controller 10 is connected with a forward/backward change-over switch 17 that instructs forward/backward traveling of the vehicle, a shift switch 18 that instructs the maximum speed stage among speed 1 through speed 4, the engine rotation number sensor 25 and the bucket height detection sensor 26, which are described above, and a manual/automatic shift means switching device 27 that switches whether shifting at the transmission 3 is performed automatically or manually.

In addition, the controller 10 is connected with a shift up control switching selection device 28. The shift up control switching selection device 28 is a device for switching between the normal control, in which the speed stage is shifted up from speed 2 to speed 3, and the delay control, in which shift up timing is delayed with respect to the normal control, when the vehicle speed v becomes equal to or greater than the shift permission vehicle speed if the automatic shift has been selected by the manual/automatic shift means switching device 27.

The controller 10 controls the rotational speed of the engine 1 (rotation number) in correspondence to the operation amount of the accelerator pedal 11. In addition, the controller 10 changes each of the shift permission vehicle speeds in correspondence to the rotation number of the engine 1 detected by the engine rotation number sensor 25 as described above and, if the delay control has been selected by the shift up control switching selection device 28, performs the delay control so that shift up timing from speed 2 to speed 3 is delayed. It is to be noted that the controller 10 further includes a timer (not shown) that measures shift up delay time in the delay control.

Figure 5:
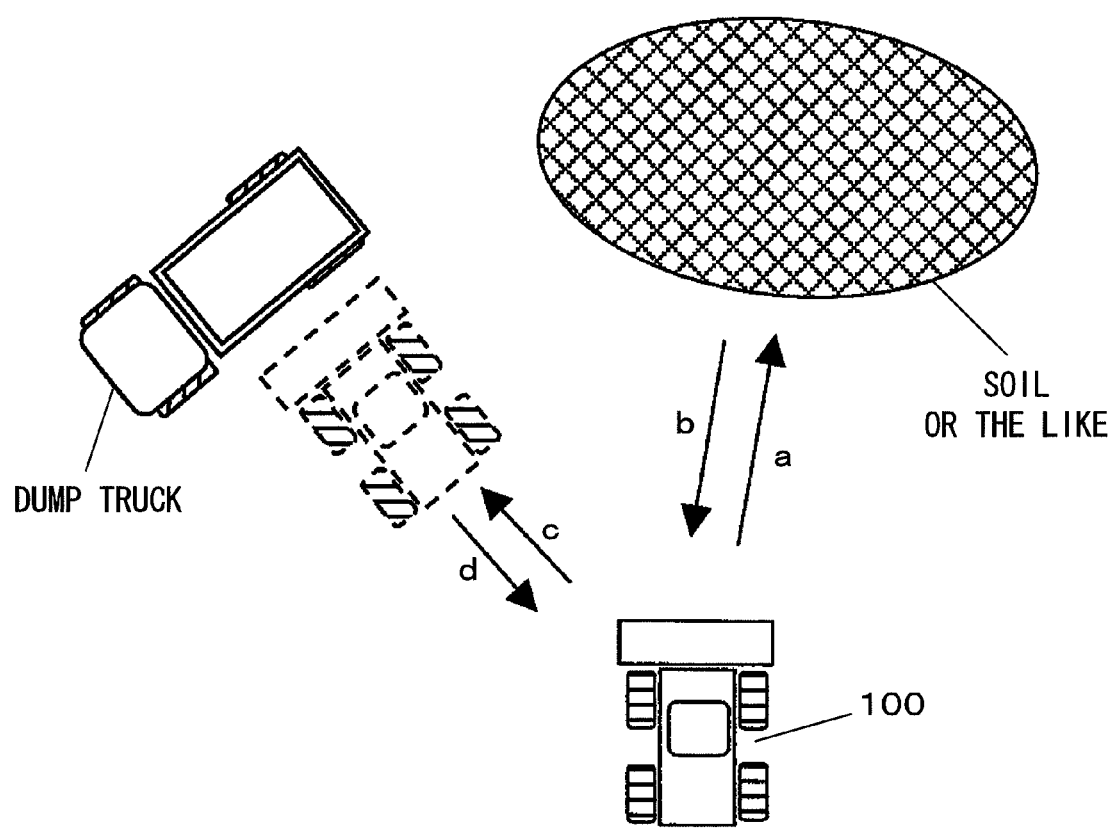
[FIG. 5] An illustration for explaining V-shape loading.

FIG. 5 is an illustration that shows V-shape loading, which is one of the methods to load soil or the like onto a dump truck. In the V-shape loading, firstly, as indicated by an arrow a, the wheel loader 100 moves forward and scoop soil or the like, and after that, as indicated by an arrow b, the wheel loader 100 moves backward shortly. Then, as indicated by an arrow c, the wheel loader 100 moves forward to the dump truck and load the scooped soil or the like onto the dump truck, and as indicated by an arrow d, the wheel loader 100 moves backward to the original position.

It will be explained with reference to FIGS. 6 (a) and (b), respectively, how the speed stage at the transmission 3 changes with the conventional wheel loader 100 during backward travel after excavating soil or the like indicated by the arrow b of FIG. 5 and during loading onto the dump truck soil or the like indicated by the arrow c.

Figure 6:
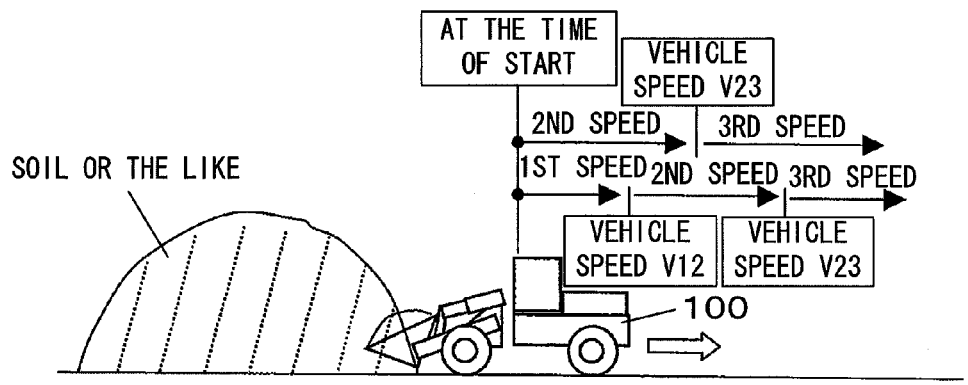
[FIG. 6] (*a*) (*b*) Illustrations of speed stage change of a transmission at the time of backward travel after excavation and at the time of loading soil or the like, respectively in the related art.
Figure 6:
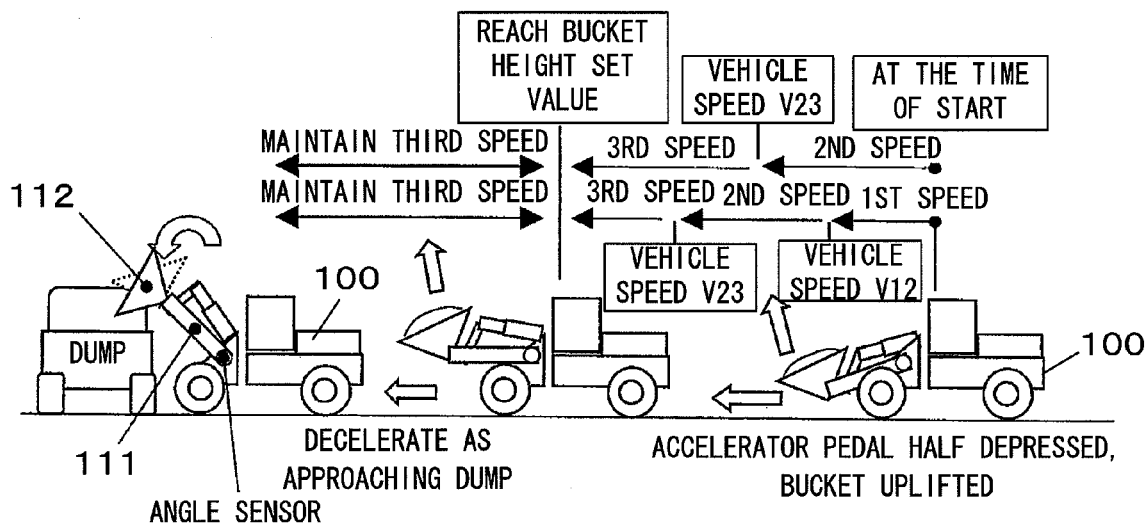

As shown in FIG. 6 (a), when the vehicle moves backward (the arrow b of FIG. 5) after excavating soil or the like using the bucket 112, since a normal excavation work is performed at speed 1 or speed 2, the speed stage at the beginning of the backward movement (at the time of start) is speed 1 or speed 2. If the depression amount of the accelerator pedal 11 is moderate and the rotation number of the engine 1 is low, the shift permission vehicle speed V23 is lowered as described above. This causes the speed stage to shift up from speed 2 to speed 3 immediately after the beginning of the backward movement. When the vehicle is switched to forward movement for approaching the dump truck with the speed stage shifted up to speed 3, the wheel loader 100 decelerates while moving backward. Hence, a backward drifting of the vehicle becomes great, and thus the vehicle cannot quickly make a transition to forward movement, resulting in low work efficiency. In a state where the speed stage is shifted up to speed 3, the drive force is small and the backward drifting of the vehicle becomes great. Here, the drifting of the vehicle means a continued backward movement of the vehicle, which is unexpectedly larger than the operator intended, due to an increased braking distance for switching the vehicle movement from backward to forward in a state where the speed stage is shifted up to, for example, speed 3 and the vehicle speed is increased.

As shown in FIG. 6 (b), when the vehicle is switched to forward movement and loads soil or the like onto the dump truck (the arrow c of FIG. 5), the wheel loader 100 moves forward to the dump truck while uplifting the bucket 112. The speed stage at the beginning of the forward movement (at the time of start) towards the dump truck is speed 1 or speed 2. When the depression amount of the accelerator pedal 11 is small and the rotation number of the engine 1 is low, the shift permission vehicle speed v23 is lowered as described above. For this reason, before the bucket 112 is uplifted to a height required for loading soil onto the dump truck, the vehicle speed reaches the shift permission vehicle speed v23 and the speed stage is shifted up from speed 2 to speed 3.

Since this shift up causes the vehicle speed to further increase, the wheel loader 100 may reach the dump truck before the bucket 112 uplifts to a height required for loading soil onto the dump truck. In this case, the operator of the wheel loader 100 needs to apply the brake to stop the wheel loader 100 and uplift the bucket 112. This not only causes the work efficiency to be reduced but also the operator of the wheel loader 100 to feel cumbersome.

There is a transmission device known in the related art that is configured to, when the height of the bucket 112 becomes equal to or greater than a setting height, maintain the speed stage at that time. However, even if such transmission device is adopted in the wheel loader 100, if the vehicle speed reaches the shift permission vehicle speed v23 and the speed stage is shifted up from speed 2 to speed 3 before the bucket 112 reaches the set height, as shown in FIG. 6 (b), the above-described inconveniency cannot be solved. In addition, a low setting height will result in another inconveniency that the speed stage is held at one that is not intended by the operator at the time of excavation work or high-speed travel, in which the bucket 112 is kept in a low height position.

In the present embodiment, on the other hand, the delay control to delay shift up from speed 2 to speed 3 is performed so that, during backward movement after excavation (the arrow b) and during loading soil onto a dump truck (the arrow c), shift up timing from speed 2 to speed 3 is delayed compared to that in a conventional wheel loader and thus an undesired drifting of the vehicle and a speed increase are suppressed. More specifically, if the delay control is selected by the shift up control switching selection device 28, the shift up permission vehicle speed, at which the speed stage is shifted up from speed 2 to speed 3 is permitted, is set based upon the direction of vehicle movement and the height of the bucket 112 used as a working machine device. A case in which the maximum speed stage has been set to speed 3 by the shift switch 18 is explained in detail below.

(1) Delay Control During Backward Travel

When the vehicle travels backward after excavating soil or the like as indicated by the arrow b, the shift permission vehicle speed, at which the speed stage is shifted up from speed 2 to speed 3 is permitted, is set to the second shift up permission vehicle speed V23a regardless of the height of the bucket 112. As described above, the second shift up permission vehicle speed V23a is set to a value greater than the first shift up permission vehicle speed V23. The controller 10 permits the speed stage to be shifted up from speed 2 to speed 3 when the vehicle speed that is equal to or greater than the second shift up permission vehicle speed V23a is kept for equal to or greater than a backward travel setting time Tr. The backward travel setting time Tr is set in advance to an appropriate value so that shift up to speed 3 is less likely to occur, for example, when traveling backward in V-shape loading. For instance, the backward travel setting time is Tr=5 seconds.

Figure 7:
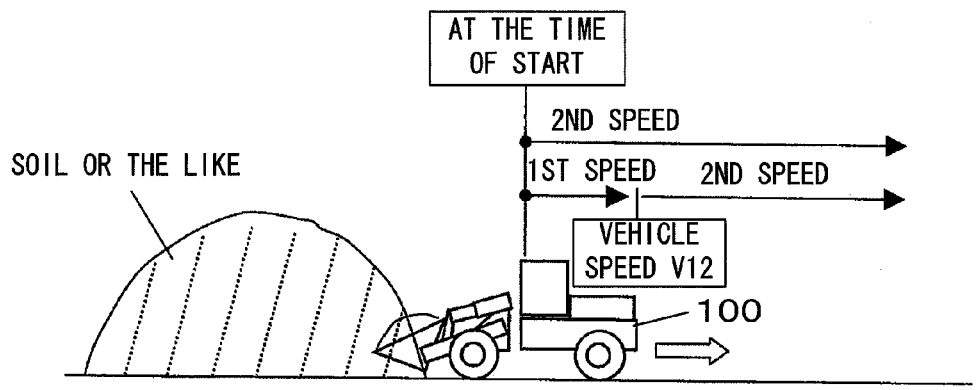
[FIG. 7] (*a*) (*b*) Illustrations of speed stage change of a transmission at the time of backward travel after excavation and at the time of loading soil or the like, respectively according to the embodiment.
Figure 7:
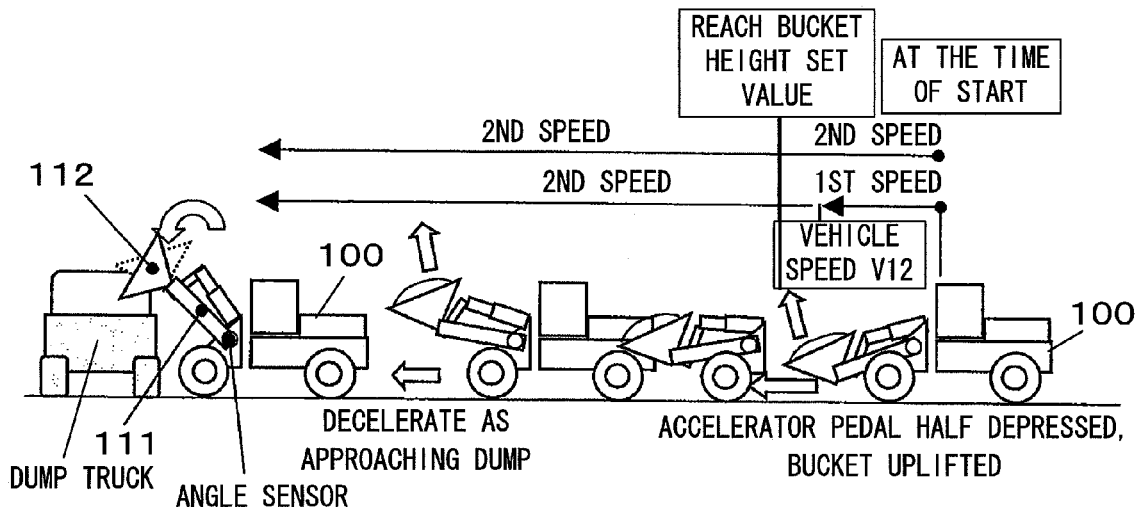

As shown in FIG. 7 (a), when the operator fully depresses the accelerator pedal 11 (full depressing of accelerator pedal) to travel backward the vehicle after excavating soil or the like, the vehicle speed may have a possibility to be equal to or greater than the second shift up permission vehicle speed V23a. However, the speed stage is not shifted up from speed 2 to speed 3 before the backward travel setting time Tr has elapsed. Since a period of time to travel backward in V-shape loading is approximately 3 to 4 seconds normally, setting the backward travel setting time Tr to, for example, 5 seconds allows the speed stage not to be shifted up to speed 3 during backward traveling in most cases, allowing the vehicle to maintain and travel at speed 2.

When the operator depresses the accelerator pedal 11 approximately half to travel backward (half-way depressing of accelerator pedal), since the vehicle speed does not increase to the second shift up permission vehicle speed V23a normally, the wheel loader maintains and travels at speed 2. This reduces the vehicle drifting when switching from backward travel to forward travel. In addition, the vehicle starts traveling at speed 1 or speed 2 after switching to forward travel, thereby achieving excellent acceleration and reducing work time (cycle time).

(2) Delay Control During Forward Travel

If the vehicle travels forward as indicated by the arrow c, the first shift up permission vehicle speed V23, at which the speed stage is permitted to be shifted up from speed 2 to speed 3 when the height of the bucket 112 is lower than the set value, and the second shift up permission vehicle speed V23a, at which the speed stage is permitted to be shifted up from speed 2 to speed 3 when the height of the bucket 112 is equal to or greater than its setting value, are set.

The setting value of the height of the bucket 112 is set to, for instance, the midway position between the height of the bucket 112 in a carry position and the height of the bucket 112 at a maximum reach where the arms 111 become substantially horizontal. Here, the height of the bucket 112 in a carry position refers to the height of the bucket 112 when the lower end (lower surface) of the bucket 112 is positioned in the vicinity of the lowest above-ground height of the wheel loader 100. A state in which the arms 111 become substantially horizontal refers to a state in which the swing center of the base end of the arm 111 and the swing center of the bucket 112 at the top end of the arm become substantially horizontal.

As shown in FIG. 7 (b), when the height of the bucket 112 is raised to the setting value, the vehicle speed at which the speed stage is permitted to be shifted up from speed 2 to speed 3 is increased from the first shift up permission vehicle speed V23 to the second shift up permission vehicle speed V23a. When the operator fully depresses the accelerator pedal 11 to travel forward, the vehicle speed may have a possibility to be equal to or greater than the second shift up permission vehicle speed V23a. However, the speed stage is not shifted up from speed 2 to speed 3 before the forward travel setting time Tf has elapsed. A period of time to travel forward maintaining the bucket 112 at a height of equal to or greater than the setting value for loading soil onto the dump truck is approximately 2 to 3 seconds normally. Accordingly, by setting the forward travel setting time Tf to, for example, 4 seconds allows in most cases the vehicle to approach the dump truck without shifting up the speed stage to speed 3.

When the operator depresses the accelerator pedal 11 approximately half to travel forward (half-way depressing of accelerator pedal), since the vehicle speed does not increase to the second shift up permission vehicle speed V23a normally, the wheel loader can approach the dump truck maintaining speed 2 in a state where the bucket 112 is held at a height equal to or greater than its setting value. This eliminates the need of operating the brake in a high-speed state by shifting up the speed stage of the wheel loader to speed 3 when approaching the dump truck for loading work, thereby wearing of the operator becomes less and the work efficiency is improved.

(3) Normal Control

If the normal control is selected by the shift up control switching selection device 28, regardless of the vehicle travel direction and the height of the bucket 112, the shift permission vehicle speed at which the speed stage is permitted to be shifted up from speed 2 to speed 3 is set to the first shift up permission vehicle speed V23. Due to this, both in forward travel and backward travel, when the vehicle speed becomes equal to or greater than the first shift up permission vehicle speed V23, the speed stage is rapidly shifted up from speed 2 to speed 3 without applying delay time (the forward travel setting time Tf and the backward travel setting time Tr). For instance, if the vehicle travels a long distance or the like, selecting speed 3 allows the engine rotational speed to be reduced and the vehicle to travel with low fuel consumption.

Figure 8:
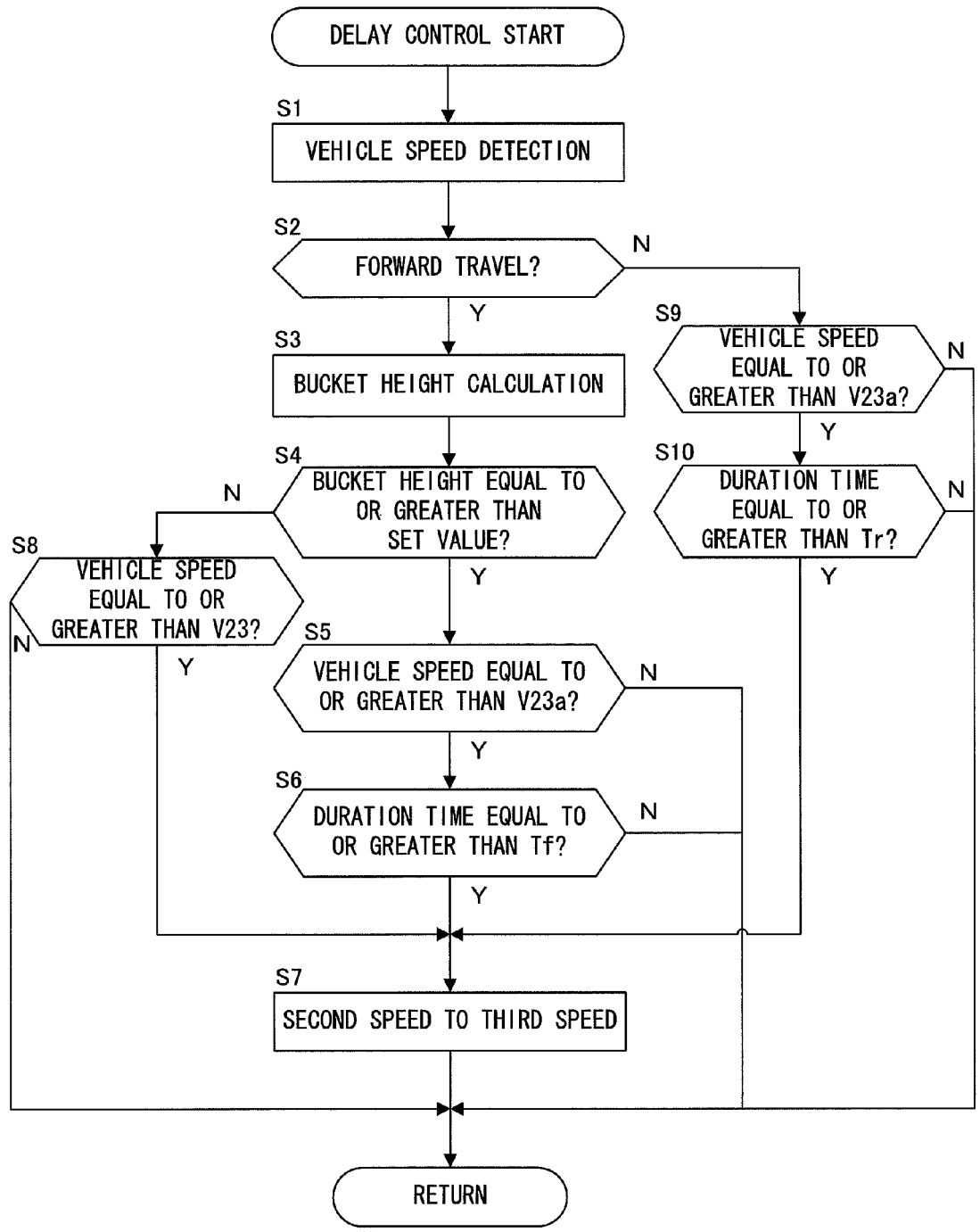
[FIG. 8] A flowchart for explaining the flow of delay control processing for shift up according to the embodiment.

FIG. 8 shows a flowchart of procedure for carrying out a shift up delay control from speed 2 to speed 3 in the present embodiment. The flowchart of FIG. 8 shows the control flow when the speed stage of the wheel loader is shifted up from speed 2 to speed 3, in particular, when the maximum speed stage has been set to speed 3 by the shift switch 18. The procedure of FIG. 8 is initiated when the delay control is selected by the shift up control switching selection device 28, and is repeatedly executed by the controller 10.

First, in step S1, the vehicle speed v is detected by the vehicle speed detector 15. In step S2, a judgment is made as to whether or not forward travel has been selected by the forward/backward change-over switch 17. If forward travel has been selected, the operation proceeds to step S3 and the height of the bucket 112 is calculated based upon a detection value of the bucket height detection sensor 26. In step S4, a judgment is made as to whether or not the height of the bucket 112 calculated in step S3 has exceeded a setting value. If a positive judgment is made in step S4, the operation proceeds to step 5. In step S5, a judgment is made as to whether or not the vehicle speed v detected in step S1 is equal to or greater than the second shift up permission vehicle speed V23a.

If a positive judgment is made in step S5, the operation proceeds to step S6 and a judgment is made as to whether or not a vehicle speed that is equal to or greater than the second shift up permission vehicle speed V23a has continued for equal to or greater than the forward travel setting time Tf. If a positive judgment is made in step S6, the operation proceeds to step S7 and the speed stage is shifted up from speed 2 to speed 3. On the other hand, if a negative judgment is made in step S5 or S6, the speed stage is not shifted up from speed 2 to speed 3 and the procedure of FIG. 8 is repeated. It is to be noted that if a negative judgment is made in step S5, the controller 10 resets the timer (not shown) that measures the elapsed time since the vehicle speed v has become equal to or greater than the second shift up permission vehicle speed V23a.

If a negative judgment is made in step S4 and the height of the bucket 112 is lower than the setting value, the operation proceeds to step S8. In step S8, a judgment is made as to whether or not the vehicle speed v is equal to or greater than the first shift up permission vehicle speed V23. If a positive judgment is made in step S8, the operation proceeds to step S7 and the speed stage is shifted up from speed 2 to speed 3. If a negative judgment is made in step S8, the speed stage is not shifted up from speed 2 to speed 3 and the procedure of FIG. 8 is repeated.

On the other hand, if a negative judgment is made in step S2 and backward travel has been selected by the forward/backward change-over switch 17, the operation proceeds to step S9. In step S9, a judgment is made as to whether or not the vehicle speed v is equal to or greater than the second shift up permission vehicle speed V23a. If a positive judgment is made in step S9, the operation proceeds to step S10 and a judgment is made as to whether or not a vehicle speed that is equal to or greater than the second shift up permission vehicle speed V23a has continued for equal to or greater than the backward travel setting time Tr. If a positive judgment is made in step S10, the operation proceeds to step S7 and the speed stage is shifted up from speed 2 to speed 3. On the other hand, if a negative judgment is made in step S9 or S10, the speed stage is not shifted up from speed 2 to speed 3 and the procedure of FIG. 8 is repeated. It is to be noted that if a negative judgment is made in step S9, the controller 10 resets the timer (not shown) that measures the elapsed time since the vehicle speed v has become equal to or greater than the second shift up permission vehicle speed V23a.

The following operations and advantageous effects can be achieved according to the present embodiment.

(1) The controller 10 of the wheel loader 100 performs automatic shift control by vehicle speed based control in which shift up is permitted when the vehicle speed v becomes equal to or greater than the shift up permission vehicle speed. In the embodiment described above, the shift up control switching selection device 28 is included so as to enable switching between the normal control, in which shift up is performed when the vehicle speed v becomes equal to or greater than the shift up permission vehicle speed, and the delay control, in which shift up timing is delayed with respect to the normal control. This allows the operator of the wheel loader 100 to voluntarily switch and select the automatic shift control between the normal control and the delay control in correspondence to a work content by the wheel loader 100 and to a taste of the operator. Selecting the delay control can suppress shift up due to lowering of shift permission speed, for example, in V-shape loading and a speed increase in the wheel loader 100 caused by the shift up, which is against the operator's intension. Accordingly, an inconveniency that the wheel loader 100 reaches the dump truck before the bucket 112 uplifts to a height required for loading soil onto the dump truck can be prevented and lowering of work efficiency can be prevented.

(2) It is arranged that the speed stages at the transmission 3 include 3 speeds or more. When the delay control has been selected by the shift up control switching selection device 28, if forward travel is selected by the forward/backward change-over switch 17, the controller 10 sets the shift up permission vehicle speed to the first shift up permission vehicle speed V23 when the height position of the bucket 112 (working machine device) is lower than the setting value and sets shift up permission vehicle speed to the second shift up permission vehicle speed V23a, which is greater than the first shift up permission vehicle speed V23, when the height position of the bucket 112 is equal to or greater than the setting value. When the height position of the bucket 112 is equal to or greater than the set value, if the vehicle speed v has continued to be equal to or greater than the second shift up permission vehicle speed V23a for the forward travel setting time Tf, the speed stage at the transmission 3 is shifted up from speed 2 to speed 3. It is arranged that when the delay control is selected and the wheel loader 100 travels forward, if the height of the bucket 112 becomes equal to or greater than the setting value, shift up from speed 2 to speed 3 is less likely to occur. Due to this, a shift up that is against the operator's intension during travel at speed 2 is effectively suppressed, where the speed 2 is frequently used when approaching the dump truck, for example, in V-shape loading, thereby effectively preventing the defect described above.

(3) When the delay control has been selected by the shift up control switching selection device 28, if backward travel is selected by the forward/backward change-over switch 17, the controller 10 sets the shift up permission vehicle speed to the second shift up permission vehicle speed V23a, which is greater than the first shift up permission vehicle speed V23, regardless of the height of the bucket 112 and shifts up the speed stage at the transmission 3 from speed 2 to speed 3 if the vehicle speed v has continued to be equal to or greater than the second shift up permission vehicle speed V23a for the backward travel setting time Tr. As a result, when traveling backward after excavation in, for instance, V-shape loading, shift up from speed 2 to speed 3 is less likely to occur. Accordingly, the vehicle drifting when switching from backward travel to forward travel becomes small and the vehicle can be accelerated at speed 2 (or speed 1) after switching to forward travel and the work time can be reduced, thereby efficiently performing the work.

(4) When the normal control has been selected by the shift up control switching selection device 28, regardless of the height of the bucket 112 and setting of the forward/backward change-over switch 17, the shift up permission vehicle speed is set to the first shift up permission vehicle speed V23 and, when the vehicle speed v becomes equal to or greater than the first shift up permission vehicle speed V23, the speed stage at the transmission 3 is shifted up from speed 2 to speed 3. To perform shift up to speed 3 when the delay control has been selected, the vehicle speed v needs to continue to be the second shift up permission vehicle speed V23 for the setting time Tf or Tr and the vehicle needs to continue to be operated nearly in a state where the accelerator pedal is fully depressed. Hence, for a long distance travel, selecting the normal control is effective from the viewpoint of low fuel consumption operation.

—Examples of Variations—

(1) While in the explanation described above, the delay control of shift up from speed 2 to speed 3 is explained, the present invention is not limited to this example. It may be arranged that, for example, shift up from speed 1 to speed 2 is delayed and shift up from speed 3 to speed 4 is delayed. In other words, it may be arranged that shift up from a lower speed stage to the higher speed stage by 1 stage is delayed so that shift up that is against the operator's intension can be reduced during backward travel and forward travel as shown in FIGS. 7 (a) and (b), respectively. In addition, the number of selectable speed stages at the transmission 3 is not limited to 4 and it may be 3, 5, or more.

(2) While in the explanation described above, the wheel loader 100 is explained as an example of a industrial vehicle that includes the controller 10 that constitutes the shift control system, the present invention is not limited to this example and the industrial vehicle may be, for instance, a forklift, a telehandler, a lift truck, another industrial vehicle, or the like.

(3) While in the explanation described above, the second shift up permission vehicle speed v23a is set to a value that is higher by, for example, approximately 10% than a maximum value of the first shift up permission vehicle speed v23 that changes in correspondence to the rotation number of the engine 1, the present invention is not limited to this example. For example, the second shift up permission vehicle speed v23a may be set to a value that is substantially intermediate between the maximum value of the first shift up permission vehicle speed v23 that changes in correspondence to the rotation number of the engine 1 and the maximum vehicle speed V2 (refer to FIG. 4) at speed 2.

(4) The embodiments and the examples of variations described above may be combined. The disclosure of the following priority application is herein incorporated by reference: Japanese Patent Application No. 2009-283139 (filed Dec. 14, 2009)

The invention claimed is:

1. A shift control system for industrial vehicle, comprising:
a vehicle speed detection device that detects a vehicle speed of an industrial vehicle;
a transmission device that shifts up and shifts down a speed stage of a transmission;
a shift control device that permits shift up by the transmission device when a vehicle speed detected by the vehicle speed detection device becomes equal to or greater than a shift up permission vehicle speed;
a height position detection device that detects a height position of a working machine device;
a forward/backward switch device that switches the industrial vehicle between forward travel and backward travel; and
a shift up control switch selection device that switches between normal control, in which shift up is performed by the transmission device when the vehicle speed becomes equal to or greater than the shift up permission vehicle speed regardless of a travel direction of the industrial vehicle set by the forward/backward switch device and the height position of the working machine device detected by the height position detection device, and delay control, in which shift up timing is delayed by changing the shift up permission vehicle speed with respect to the normal control depending on the travel direction of the industrial vehicle or depending on the travel direction of the industrial vehicle and the height position of the working machine device.

2. A shift control system for industrial vehicle according to claim 1, wherein:
speed stages at the transmission include 3 speeds or more;
when the delay control has been selected by the shift up control switch selection device, responsive to forward travel being selected by the forward/backward switch device the shift control device sets the shift up permission vehicle speed to a first shift up permission vehicle speed responsive to a height position of the working machine device that is detected by the height position detection device being lower than a setting value, and sets the shift up permission vehicle speed to a second shift up permission vehicle speed that is greater than the first shift up permission vehicle speed responsive to a height position of the working machine device being equal to or greater than the setting value; and
when a height position of the working machine device is equal to or greater than the setting value, the shift control device controls the transmission device so that a speed stage at the transmission is shifted up from speed 2 to speed 3 responsive to the vehicle speed being maintained to be equal to or greater than the second shift up permission vehicle speed for a forward travel setting time.

3. A shift control system for industrial vehicle according to claim 1, wherein:
speed stages at the transmission include 3 speeds or more;
when the delay control has been selected by the shift up control switch selection device, responsive to backward travel being selected by the forward/backward switch device the shift control device sets the shift up permission vehicle speed to a second shift up permission vehicle speed that is greater than a first shift up permission vehicle speed, regardless of a height of the working machine device, and controls the transmission device so that a speed stage at the transmission is shifted up from speed 2 to speed 3 if the vehicle speed has continued to be equal to or greater than the second shift up permission vehicle speed for a backward travel setting time.

4. A shift control system for industrial vehicle according to claim 1, wherein:
speed stages at the transmission include 3 speeds or more;
the shift control device sets the shift up permission vehicle speed to a first shift up permission vehicle speed when the normal control has been selected by the shift up control switch selection device regardless of a height of the working machine device and setting of the forward/backward switch device, and controls the transmission device so as to shift up a speed stage at the transmission from speed 2 to speed 3 when the vehicle speed becomes equal to or greater than the first shift up permission vehicle speed.

5. A wheel loader with a shift control system, the shift control system comprising:
a vehicle speed detection device that detects a vehicle speed of an industrial vehicle;
a transmission device that shifts up and shifts down a speed stage of a transmission;
a shift control device that permits shift up by the transmission device when a vehicle speed detected by the vehicle speed detection device becomes equal to or greater than a shift up permission vehicle speed;
a height position detection device that detects a height position of a working machine device;
a forward/backward switch device that switches the industrial vehicle between forward travel and backward travel; and
a shift up control switch selection device that switches between normal control, in which shift up is performed by the transmission device when the vehicle speed becomes equal to or greater than the shift up permission vehicle speed regardless of a travel direction of the industrial vehicle set by the forward/backward switch device and the height position of the working machine device detected by the height position detection device, and delay control, in which shift up timing is delayed by changing the shift up permission vehicle speed with respect to the normal control depending on the travel direction of the industrial vehicle or depending on the travel direction of the industrial vehicle and the height position of the working machine device.

6. A shift control system for industrial vehicle according to claim 2, wherein:
speed stages at the transmission include 3 speeds or more;
when the delay control has been selected by the shift up control switch selection device, responsive to backward travel being selected by the forward/backward switch device the shift control device sets the shift up permission vehicle speed to a second shift up permission vehicle speed that is greater than a first shift up permission vehicle speed, regardless of a height of the working machine device, and controls the transmission device so that a speed stage at the transmission is shifted up from speed 2 to speed 3 responsive to the vehicle speed being maintained to be equal to or greater than the second shift up permission vehicle speed for a backward travel setting time.

7. A shift control system for industrial vehicle according to claim 2, wherein:
speed stages at the transmission include 3 speeds or more;
the shift control device sets the shift up permission vehicle speed to a first shift up permission vehicle speed when the normal control has been selected by the shift up control switch selection device regardless of a height of the working machine device and setting of the forward/backward switch device, and controls the transmission device so as to shift up a speed stage at the transmission from speed 2 to speed 3 when the vehicle speed becomes equal to or greater than the first shift up permission vehicle speed.

8. A shift control system for industrial vehicle according to claim 3, wherein:
speed stages at the transmission include 3 speeds or more;
the shift control device sets the shift up permission vehicle speed to a first shift up permission vehicle speed when the normal control has been selected by the shift up control switch selection device regardless of a height of the working machine device and setting of the forward/backward switch device, and controls the transmission device so as to shift up a speed stage at the transmission from speed 2 to speed 3 when the vehicle speed becomes equal to or greater than the first shift up permission vehicle speed.

9. A shift control system for industrial vehicle according to claim 6, wherein:
speed stages at the transmission include 3 speeds or more;
the shift control device sets the shift up permission vehicle speed to a first shift up permission vehicle speed when the normal control has been selected by the shift up control switch selection device regardless of a height of the working machine device and setting of the forward/backward switch device, and controls the transmission device so as to shift up a speed stage at the transmission from speed 2 to speed 3 when the vehicle speed becomes equal to or greater than the first shift up permission vehicle speed.

* * * * *